(12) United States Patent
Okino

(10) Patent No.: US 11,836,367 B2
(45) Date of Patent: Dec. 5, 2023

(54) INFORMATION PROCESSING DEVICE AND FILE ACCESS METHOD

(71) Applicant: Sony Interactive Entertainment Inc., Tokyo (JP)

(72) Inventor: Naoto Okino, Tokyo (JP)

(73) Assignee: Sony Interactive Entertainment Inc., Tokyo (JP)

(*) Notice: Subject to any disclaimer, the term of this patent is extended or adjusted under 35 U.S.C. 154(b) by 0 days.

(21) Appl. No.: 17/783,330

(22) PCT Filed: Sep. 28, 2020

(86) PCT No.: PCT/JP2020/036718
§ 371 (c)(1),
(2) Date: Jun. 8, 2022

(87) PCT Pub. No.: WO2021/124635
PCT Pub. Date: Jun. 24, 2021

(65) Prior Publication Data
US 2022/0398016 A1    Dec. 15, 2022

(30) Foreign Application Priority Data

Dec. 16, 2019  (JP) .................................. 2019-226720

(51) Int. Cl.
*G06F 12/10* (2016.01)
*G06F 3/06* (2006.01)
*G06F 8/65* (2018.01)

(52) U.S. Cl.
CPC ............ *G06F 3/064* (2013.01); *G06F 3/0622* (2013.01); *G06F 3/0643* (2013.01); *G06F 3/0673* (2013.01); *G06F 8/65* (2013.01)

(58) Field of Classification Search
CPC ...... G06F 3/0622; G06F 3/064; G06F 3/0643; G06F 3/0655; G06F 3/0661;
(Continued)

(56) References Cited

U.S. PATENT DOCUMENTS

| 7,587,433 B2 | 9/2009 | Peleg |
| 9,286,059 B2 | 3/2016 | Hatakeyama |

(Continued)

FOREIGN PATENT DOCUMENTS

| CN | 103440204 A | 12/2013 |
| JP | 04260945 A | 9/1992 |

(Continued)

OTHER PUBLICATIONS

Decision to Grant a Patent for corresponding JP Application No. 2019-226720, 6 pages, dated Jun. 27, 2023.

(Continued)

*Primary Examiner* — Ilwoo Park
(74) *Attorney, Agent, or Firm* — Matthew B. Dernier, Esq.

(57) ABSTRACT

A first correspondence table indicates a correspondence relation between logical blocks of a first file and physical blocks of a physical storage. A second correspondence table indicates a correspondence relation between logical blocks of a second file and the logical blocks of the first file. An access request receiving section receives an access request for the second file. A block conversion section refers to the second correspondence table, identifies a logical block of the first file associated with the logical block of the second file that is subject to the access request, and then refers to the first correspondence table to identify a physical block of the physical storage associated with the identified logical block of the first file. An accessing section accesses the identified physical block.

5 Claims, 9 Drawing Sheets

(58) Field of Classification Search
CPC .......... G06F 3/0673; G06F 8/65; G06F 8/658; G06F 12/0292; G06F 12/06; G06F 12/10
USPC .............................. 711/154, 202, 206, 209
See application file for complete search history.

(56) References Cited

U.S. PATENT DOCUMENTS

| | | | |
|---|---|---|---|
| 9,678,966 | B2 | 6/2017 | Ki |
| 9,830,345 | B1 | 11/2017 | Baars |
| 10,114,829 | B1 * | 10/2018 | Bono ................ G06F 16/172 |
| 10,146,466 | B1 | 12/2018 | Puhov |
| 10,891,389 | B2 | 1/2021 | Takumi |
| 2005/0065961 | A1 | 3/2005 | Aguren |
| 2006/0004756 | A1 | 1/2006 | Peleg |
| 2008/0082590 | A1 | 4/2008 | Hamilton |
| 2011/0245947 | A1 | 10/2011 | Morohoshi |
| 2014/0201209 | A1 | 7/2014 | Hashimoto |
| 2015/0126283 | A1 | 5/2015 | Okino |
| 2015/0126284 | A1 | 5/2015 | Okino |
| 2015/0127692 | A1 | 5/2015 | Okino |
| 2015/0134621 | A1 | 5/2015 | Ki |
| 2015/0235028 | A1 | 8/2015 | Tsuchitoi |
| 2015/0301823 | A1 | 10/2015 | Hatakeyama |
| 2016/0063018 | A1 * | 3/2016 | Das ................... G06F 16/122 707/822 |
| 2016/0179502 | A1 | 6/2016 | Cawley |
| 2017/0199817 | A1 | 7/2017 | Ishihara |
| 2018/0011649 | A1 | 1/2018 | Hashimoto |
| 2019/0286833 | A1 | 9/2019 | Takumi |
| 2020/0319816 | A1 * | 10/2020 | Li ..................... G06F 3/0659 |
| 2021/0019164 | A1 * | 1/2021 | Choudhary ......... G06F 9/45558 |

FOREIGN PATENT DOCUMENTS

| | | | |
|---|---|---|---|
| JP | 2000215201 | A | 8/2000 |
| JP | 2008501180 | A | 1/2008 |
| JP | 2008123104 | A | 5/2008 |
| JP | 2010515163 | A | 5/2010 |
| JP | 2015088144 | A | 5/2015 |
| JP | 2015095262 | A | 5/2015 |
| JP | 2015207145 | A | 11/2015 |
| JP | 2017123110 | A | 7/2017 |
| JP | 2019091477 | A | 6/2019 |
| JP | 2019114076 | A | 7/2019 |
| JP | 2019159830 | A | 9/2019 |
| JP | 2019164705 | A | 9/2019 |
| KR | 20170075009 | A * | 6/2017 |
| WO | 2008083001 | A1 | 7/2008 |
| WO | 2015039028 | A1 | 3/2015 |
| WO | WO-2021036848 | A1 * | 3/2021 |

OTHER PUBLICATIONS

Notice of Reasons for Refusal for related JP Application No. 2019-226718, 6 pages, dated Mar. 30, 2023.
International Search Report for corresponding PCT Application No. PCT/JP2020/036718, 4 pages, dated Dec. 15, 2020.
International Search Report for corresponding PCT Application No. PCT/JP2020/036717, 4 pages, dated Dec. 1, 2020.
International Search Report for corresponding PCT Application No. PCT/JP2020/036716, 4 pages, dated Nov. 2, 2020.
Jett, Jacob, et al., "A Conceptual Model for Video Games and Interactive Media", Journal of the Association for Information Science and Technology, vol. 67, No. 3, pp. 505-517, May 18, 2015.
Vaniea, Kami, et al., "Tales of Software Updates: The process of updating software", Software and Programming Tools: CHI4good CHI 2016, pp. 3215-3226, May 7-16, 2016.
Microsoft Computer Dictionary, 5th Edition, Microsoft Press, Redmond, WA, p. 211, May 1, 2002.

* cited by examiner

FIG. 5

| FIRST CORRESPONDENCE TABLE ||
| FILE (LOGICAL BLOCK) | PHYSICAL STORAGE (PHYSICAL BLOCK) |
| --- | --- |
| LOGICAL BLOCK 1 OF GAME FILE | 1 |
| LOGICAL BLOCK 2 OF GAME FILE | 2 |
| LOGICAL BLOCK 3 OF GAME FILE | 3 |
| LOGICAL BLOCK 4 OF GAME FILE | 4 |
| LOGICAL BLOCK 5 OF GAME FILE | 5 |
| LOGICAL BLOCK 6 OF GAME FILE | 6 |
| LOGICAL BLOCK 7 OF GAME FILE | 7 |
| LOGICAL BLOCK 8 OF GAME FILE | 8 |
| LOGICAL BLOCK 9 OF GAME FILE | 9 |
| LOGICAL BLOCK 10 OF GAME FILE | 10 |
|  | 11 |
|  | 12 |
|  | 13 |
|  | 14 |
|  | 15 |
|  | 16 |
|  | 17 |
|  | 18 |
|  | 19 |
|  | 20 |
|  | 21 |
|  | 22 |
|  | 23 |
|  | 24 |
|  | 25 |
|  | 26 |
|  | 27 |
|  | 28 |
|  | 29 |
|  | 30 |
|  | 31 |
|  | 32 |

132

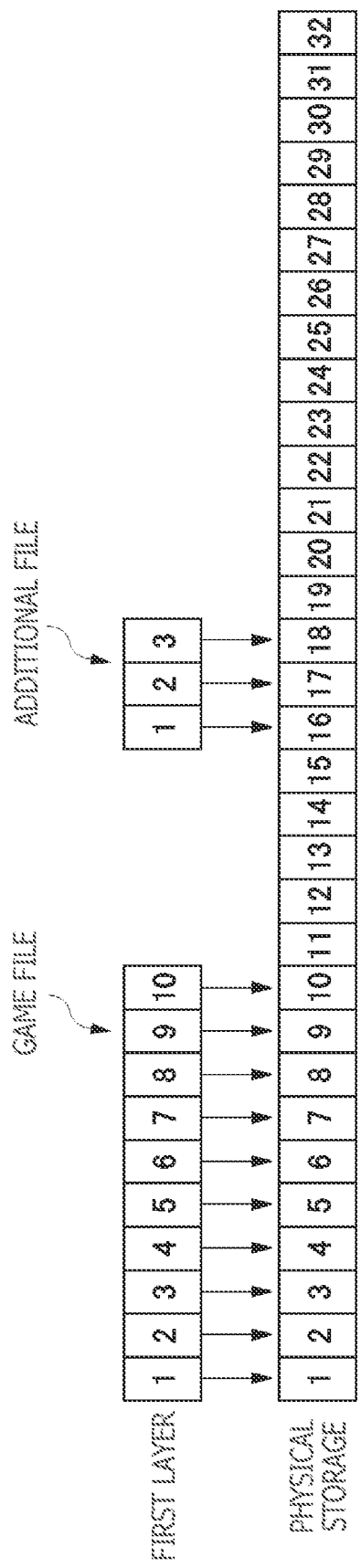

FIG. 7

| FIRST CORRESPONDENCE TABLE ||
| FILE (LOGICAL BLOCK) | PHYSICAL STORAGE (PHYSICAL BLOCK) |
| --- | --- |
| LOGICAL BLOCK 1 OF GAME FILE | 1 |
| LOGICAL BLOCK 2 OF GAME FILE | 2 |
| LOGICAL BLOCK 3 OF GAME FILE | 3 |
| LOGICAL BLOCK 4 OF GAME FILE | 4 |
| LOGICAL BLOCK 5 OF GAME FILE | 5 |
| LOGICAL BLOCK 6 OF GAME FILE | 6 |
| LOGICAL BLOCK 7 OF GAME FILE | 7 |
| LOGICAL BLOCK 8 OF GAME FILE | 8 |
| LOGICAL BLOCK 9 OF GAME FILE | 9 |
| LOGICAL BLOCK 10 OF GAME FILE | 10 |
|  | 11 |
|  | 12 |
|  | 13 |
|  | 14 |
|  | 15 |
| LOGICAL BLOCK 1 OF ADDITIONAL FILE | 16 |
| LOGICAL BLOCK 2 OF ADDITIONAL FILE | 17 |
| LOGICAL BLOCK 3 OF ADDITIONAL FILE | 18 |
|  | 19 |
|  | 20 |
|  | 21 |
|  | 22 |
|  | 23 |
|  | 24 |
|  | 25 |
|  | 26 |
|  | 27 |
|  | 28 |
|  | 29 |
|  | 30 |
|  | 31 |
|  | 32 |

132

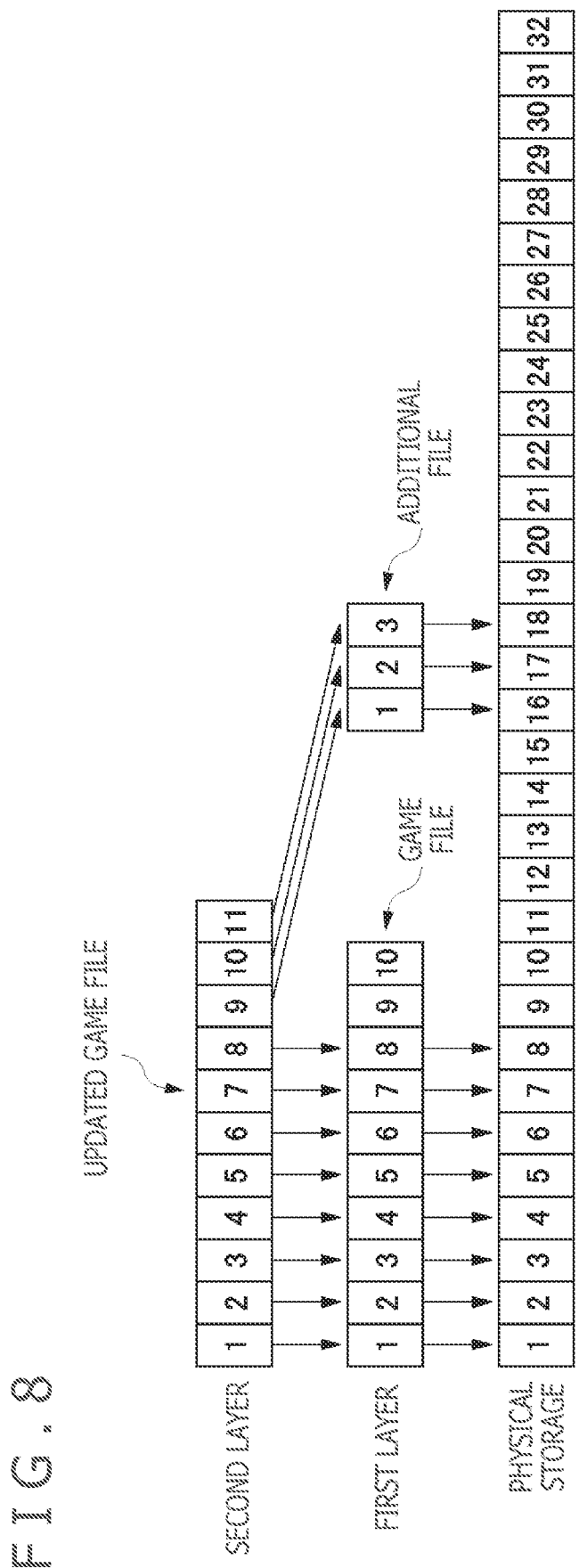

F I G . 9

| SECOND CORRESPONDENCE TABLE ||
| FILE (LOGICAL BLOCK) | FILE (LOGICAL BLOCK) |
| --- | --- |
| LOGICAL BLOCK 1 OF UPDATED GAME FILE | LOGICAL BLOCK 1 OF GAME FILE |
| LOGICAL BLOCK 2 OF UPDATED GAME FILE | LOGICAL BLOCK 2 OF GAME FILE |
| LOGICAL BLOCK 3 OF UPDATED GAME FILE | LOGICAL BLOCK 3 OF GAME FILE |
| LOGICAL BLOCK 4 OF UPDATED GAME FILE | LOGICAL BLOCK 4 OF GAME FILE |
| LOGICAL BLOCK 5 OF UPDATED GAME FILE | LOGICAL BLOCK 5 OF GAME FILE |
| LOGICAL BLOCK 6 OF UPDATED GAME FILE | LOGICAL BLOCK 6 OF GAME FILE |
| LOGICAL BLOCK 7 OF UPDATED GAME FILE | LOGICAL BLOCK 7 OF GAME FILE |
| LOGICAL BLOCK 8 OF UPDATED GAME FILE | LOGICAL BLOCK 8 OF GAME FILE |
| LOGICAL BLOCK 9 OF UPDATED GAME FILE | LOGICAL BLOCK 1 OF ADDITIONAL FILE |
| LOGICAL BLOCK 10 OF UPDATED GAME FILE | LOGICAL BLOCK 2 OF ADDITIONAL FILE |
| LOGICAL BLOCK 11 OF UPDATED GAME FILE | LOGICAL BLOCK 3 OF ADDITIONAL FILE |

134

INFORMATION PROCESSING DEVICE AND FILE ACCESS METHOD

The present invention relates to a technique for accessing a file.

BACKGROUND ART

Conventionally, game software has been distributed and sold on a read-only memory (ROM) medium such as an optical disc, a magneto-optical disc, or a Blu-ray disc. In recent years, there has becoming popular a service in which a content server transmits an image file of game software to a user terminal device via the Internet.

Game software includes a file group for executing a game such as a startup file and a game program, and a file group used by an operating system (OS) of a game device. As hardware specifications of a game device have been improved dramatically, the number of files included in the game software becomes large, and a data size tends to be increased.

SUMMARY

Technical Problems

A conventional procedure of updating game software that has been installed with use of a patch file will be described. First, an installer inquires of a content server on a data size of an updated version of game software. The updated version of game software includes part or all of the installed game software and a patch file. When obtaining the data size of the updated version of game software from the content server, the installer secures an amount of free space corresponding to the data size on a physical storage. Then, the installer copies the files of the game software to be reused to the secured free space while installing an additional file downloaded from the content server. Subsequently, the installer deletes all the files of the game software which has been installed, from the physical storage.

According to the conventional procedure, the installer needs to secure the free space for the data size of the updated version of the game software on the physical storage. However, since this data size is large, the free capacity may not be able to be secured. The present inventor has conceived of a technique of reducing the free capacity to be secured without performing a copying process of the game software in the conventional procedure.

In view of this, the present invention has an object to provide a technique of using a file recorded on the physical storage suitably, without performing a file copying process.

Solution to Problems

In order to solve the problems described above, an information processing device according to an aspect of the present invention has a function of accessing a file, including a first correspondence table indicating a correspondence relation between logical blocks of a first file and physical blocks of a physical storage, a second correspondence table indicating a correspondence relation between logical blocks of a second file and the logical blocks of the first file, an access request receiving section which receives an access request for the second file, a block conversion section which refers to the second correspondence table, identifies a logical block of the first file associated with the logical block of the second file that is subject to the access request, and then refers to the first correspondence table to identify a physical block of the physical storage associated with the identified logical block of the first file, and an accessing section which accesses the identified physical block.

Another aspect of the present invention is a method of accessing a fil, including a step of holding a first correspondence table indicating a correspondence relation between logical blocks of a first file and physical blocks of a physical storage, and a second correspondence table indicating a correspondence relation between logical blocks of a second file and the logical blocks of the first file, a step of receiving an access request for the second file, a step of referring to the second correspondence table, and identifying a logical block of the first file associated with the logical block of the second file that is subject to the access request, and then referring to the first correspondence table to identify a physical block of the physical storage associated with the identified logical block of the first file, and a step of accessing the identified physical block.

It is noted that any combinations of the constituent components described above and the expressions of the present invention that are converted between a method, an apparatus, a system, a recording medium, a computer program, and the like are also effective as aspects of the present invention.

BRIEF DESCRIPTION OF DRAWINGS

FIG. 5 is a diagram illustrating an example of a first correspondence table.

FIG. 6 is a diagram illustrating a state in which an additional file is recorded on the physical storage.

FIG. 7 is a diagram illustrating an example of the first correspondence table.

FIG. 8 is a diagram illustrating the updated game software.

FIG. 9 is a diagram illustrating an example of a second correspondence table.

DESCRIPTION OF EMBODIMENT

Figure 1:
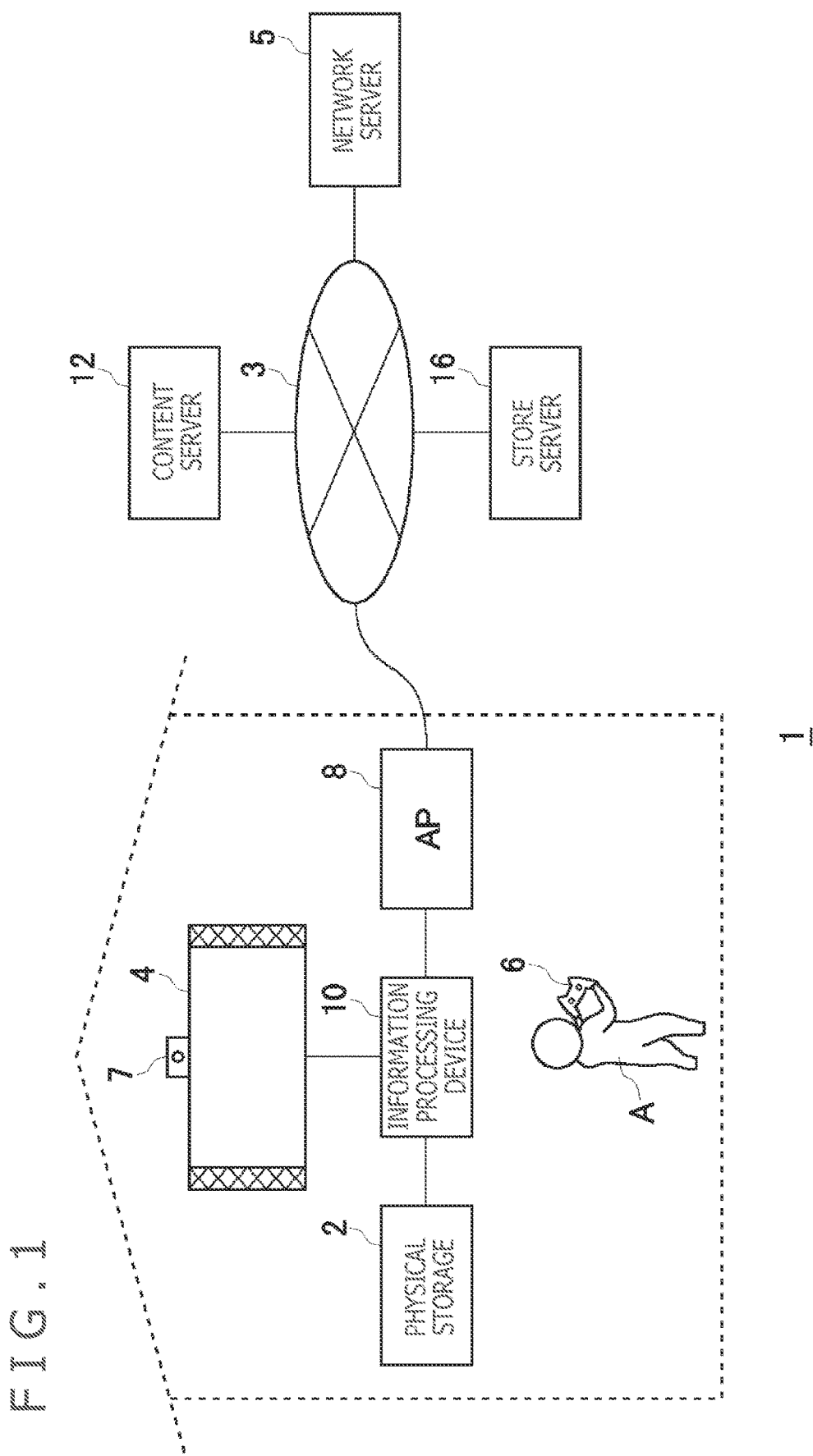
FIG. 1 is a diagram illustrating a configuration of an information processing system according to an embodiment of the present invention.

FIG. 1 illustrates an information processing system 1 according to an embodiment of the present invention. The information processing system 1 includes an information processing device 10, a network server 5, a content server 12 which distributes digital content, and a store server 16 which sells the digital content. An access point (hereinafter referred to as an "AP") 8 has functions of a wireless access point and a router. The information processing device 10 is connected, through the AP 8, to the network server 5, the content server 12, and the store server 16 on a network 3 in such a manner as to be able to communicate with the network server 5, the content server 12, and the store server 16. The network 3 may include the Internet, local area network (LAN), or the like.

The information processing device 10 is connected to an input device 6 operated by a user in a wireless or a wired manner. The input device 6 outputs operation information indicating a result of operation by the user to the information processing device 10. When receiving the operation information from the input device 6, the information processing device 10 reflects the operation information in processing of an operating system (OS) or an application, and causes an output device 4 to output a result of the processing. In the embodiment, the information processing device 10 is a game device that executes a game program by accessing files included in the game software. The input device 6 may be an apparatus, such as a game controller, which supplies the operation information of the user to the information processing device 10.

The network server 5 is maintained and managed by an operating entity that operates the information processing system 1. The network server 5 provides a network service to the user of the information processing system 1. The network server 5 manages a network account identifying the user. The user signs in to the network service provided by the network server 5, using the network account. By signing in to the network service, the user can purchase digital content from the store server 16 and receive the purchased digital content distributed from the content server 12. The digital content may be various types of application software. However, the following description will be made particularly of a case in which the digital content is game software.

A physical storage 2 is an auxiliary storage device such as a hard disk drive (HDD) or a solid state drive (SSD). The physical storage 2 may be a built-in type storage device or may be an external storage device connected to the information processing device 10 by a universal serial bus (USB) or the like. The output device 4 may be a television set including a display which outputs an image and a speaker which outputs sound, or may be a head mounted display. A camera 7 captures an image of a space in which the user is present. The input device 6 may include a plurality of input sections such as a plurality of push type operating buttons, an analog stick allowing an analog quantity to be input, and a rotary button.

Figure 2:
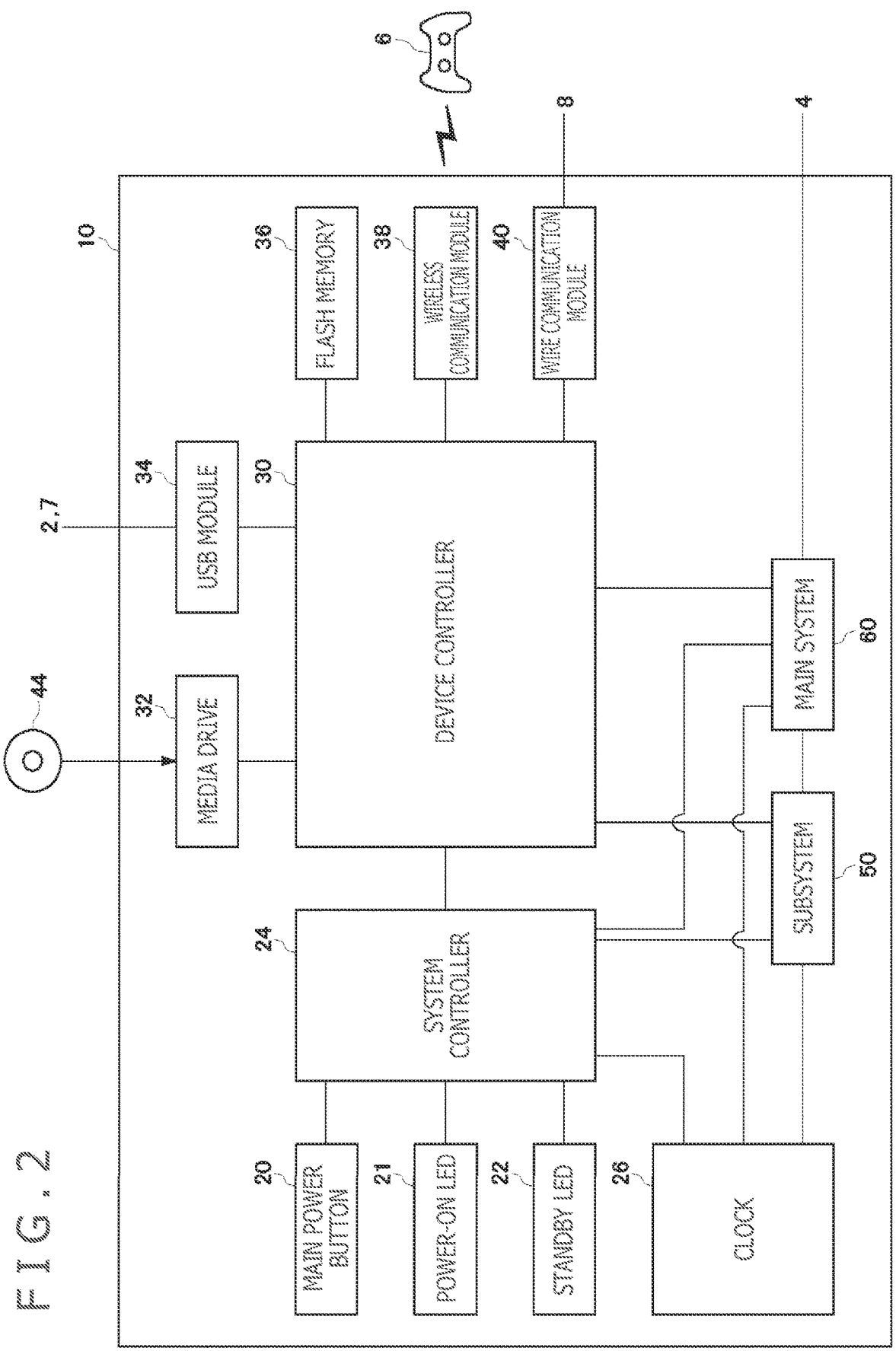
FIG. 2 is a diagram illustrating a hardware configuration of an information processing device.

FIG. 2 illustrates a hardware configuration of the information processing device 10. The information processing device 10 includes a main power supply button 20, a power-on light-emitting diode (LED) 21, a standby LED 22, a system controller 24, a clock 26, a device controller 30, a media drive 32, a USB module 34, a flash memory 36, a wireless communication module 38, a wire communication module 40, a subsystem 50, and a main system 60.

The main system 60 includes a main central processing unit (CPU), a memory as a main storage device, a memory controller, a graphics processing unit (GPU), and the like. The GPU is used mainly for arithmetic processing of a game program. These functions may be constructed as a system on a chip, and thus formed on one chip. The main CPU has a function of activating the OS and executing the game program recorded in the physical storage 2 or on a read only memory (ROM) medium 44 under an environment provided by the OS.

The subsystem 50 includes a sub-CPU, a memory as a main storage device, a memory controller, and the like. The subsystem 50 does not include a GPU and does not have the function of executing the game program. The number of circuit gates of the sub-CPU is smaller than the number of circuit gates of the main CPU. The power consumption in operation of the sub-CPU is lower than the power consumption in operation of the main CPU.

The main power supply button 20 is a button by which operating input from the user is performed. The main power supply button 20 is provided to a front surface of a casing of the information processing device 10. The main power supply button 20 is operated to turn on or off the supply of power to the main system 60 of the information processing device 10. The power-on LED 21 is lighted when the main power supply button 20 is turned on. The standby LED 22 is lighted when the main power supply button 20 is turned off.

The system controller 24 detects depression of the main power supply button 20 by the user. When the main power supply button 20 is depressed while the main power supply is in an off state, the system controller 24 obtains the depressing operation as a "turn-on instruction." Conversely, when the main power supply button 20 is depressed while the main power supply is in an on state, the system controller 24 obtains the depressing operation as a "turn-off instruction."

The clock 26 is a real-time clock. The clock 26 generates the current date and time information, and supplies the generated date and time information to the system controller 24, the subsystem 50, and the main system 60.

The device controller 30 is configured as a large-scale integrated circuit (LSI) which executes delivery of information between devices like a south bridge. As illustrated in FIG. 2, such devices as the system controller 24, the media drive 32, the USB module 34, the flash memory 36, the wireless communication module 38, the wire communication module 40, the subsystem 50, and the main system 60 are connected to the device controller 30. The device controller 30 absorbs differences between electrical characteristics of the respective devices and differences between data transfer rates, and controls data transfer timing.

The media drive 32 is a drive device that is loaded with the ROM medium 44 on which such application software as a game and license information are recorded, that drives the ROM medium 44 to read a program, data, and the like from the ROM medium 44. The ROM medium 44 is a read-only recording medium such as an optical disc, a magneto-optical disc, or a Blu-ray disc.

The USB module 34 is a module connected to an external apparatus by a USB cable. The USB module 34 may be connected to the physical storage 2 and the camera 7 by a USB cable. The flash memory 36 is an auxiliary storage device forming an internal storage. The wireless communication module 38 performs wireless communication with the input device 6, for example, using a communication protocol such as a Bluetooth (registered trademark) protocol or Institute of Electrical and Electronic Engineers (IEEE) 802.11 protocol. Incidentally, the wireless communication module 38 may support a digital mobile telephone system. The wire communication module 40 performs wire communication with an external apparatus and is connected to the network 3 via the AP 8.

Figure 3:
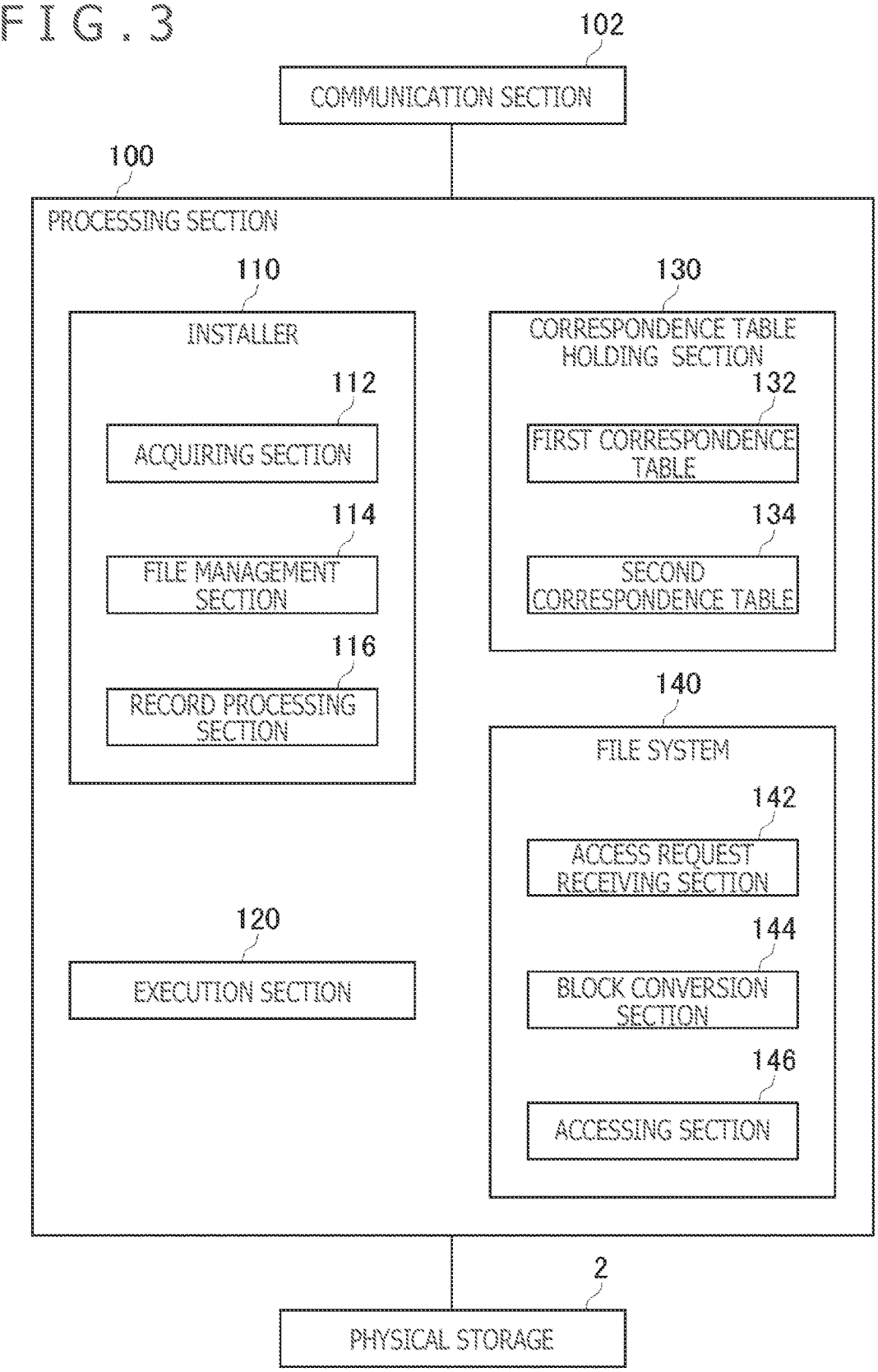
FIG. 3 is a diagram illustrating functional blocks of the information processing device.

FIG. 3 illustrates functional blocks of the information processing device 10. The information processing device 10 includes a processing section 100 and a communication section 102. The processing section 100 includes an installer 110, an execution section 120, a correspondence table holding section 130, and a file system 140. The communication section 102 is represented as such a configuration as to have functions of the wireless communication module 38 and the wire communication module 40 which are illustrated in FIG. 2.

The installer 110 includes an acquisition section 112, a file management section 114, and a record processing section 116. The file system 140 includes an access request receiving section 142, a block conversion section 144, and an accessing section 146. The correspondence table holding section 130 holds a first correspondence table 132 indicating a correspondence relation between logical blocks of a first file and physical blocks of the physical storage 2, and a second correspondence table 134 indicating a correspondence relation between logical blocks of a second file and the logical blocks of the first file. For example, the first file may be game software, and the second file may be an updated version of game software in which an additional file is added to some or all of files of the game software.

A configuration of the processing section 100 is implemented by a CPU of any computer, memory, a program loaded in the memory, a storage, and the like, as hardware components. However, the functional blocks implemented by a cooperation among these components are illustrated in this figure. Hence, it is to be understood by those skilled in the art that these functional blocks can be implemented in various forms by hardware only, by software only, or by a combination of hardware and software.

When the user purchases a game from the store server 16, the installer 110 performs a downloading process of the purchased game software from the content server 12. Prior to downloading of the game software, the file management section 114 acquires the data size of the game software from the content server 12 to secure a free space for the data size on the physical storage 2. Then, the acquisition section 112 downloads the game software, and the record processing section 116 installs the game software into the secured physical storage 2.

Figure 4:
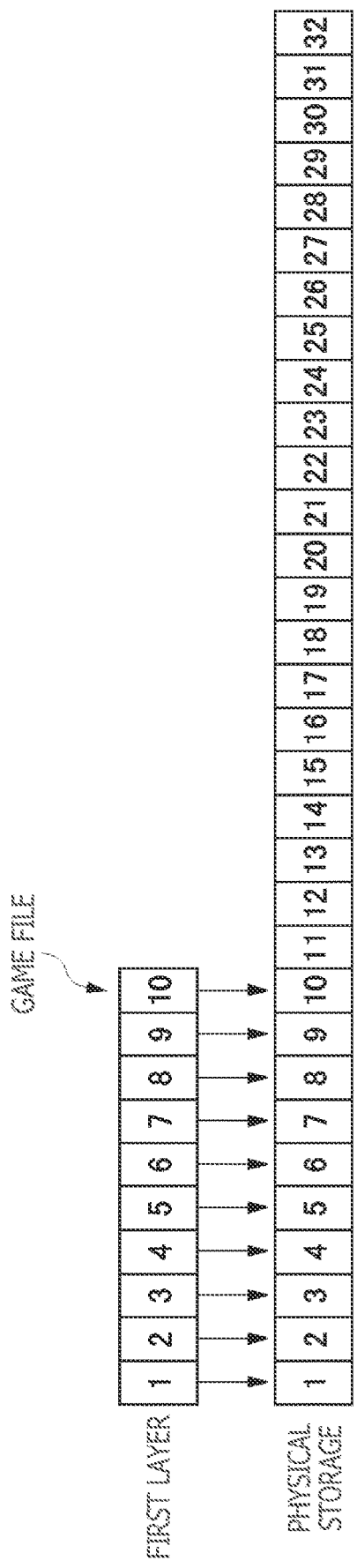
FIG. 4 is a diagram illustrating a state in which data of game software is recorded on a physical storage.

FIG. 4 illustrates a state in which data of the game software is recorded on the physical storage 2. The physical storage 2 is divided into a plurality of physical blocks, and the physical blocks are assigned physical block numbers (addresses). The physical block numbers have consecutive numbers starting from 1. The record processing section 116 records the data of the game software into the plurality of physical blocks.

Hereinafter, game software may be referred to simply as a "game file." A game file is divided into N (N is plural) number of logical blocks, and the logical blocks are assigned logical block numbers in the game file. The file management section 114 associates N logical blocks of the game files with corresponding ones of the plurality of physical blocks. In this example, one logical block corresponds to one physical block, and specifically, the logical blocks having the logical block numbers 1 to 10 in the game file are associated with the physical blocks having the physical block numbers 1 to 10. The physical block in which data of the game file is recorded is a space secured on the physical storage 2 by the file management section 114 prior to downloading.

FIG. 5 illustrates an example of the first correspondence table 132 indicating the correspondence relation in FIG. 4. The file management section 114 creates the first correspondence table 132 indicating the correspondence relation between N logical blocks of the game file and the corresponding ones of the plurality of physical blocks of the physical storage 2 and causes the correspondence table holding section 130 to hold the created first correspondence table 132. It is to be noted that, in the present embodiment, the logical blocks and the physical blocks are associated with each other on a one-to-one basis. However, one logical block may be associated with a plurality of physical blocks, and a plurality of logical blocks may be associated with one physical block.

Hereinafter, operation of the processing section 100 when the user plays a game will be described. The execution section 120 executes the game program, and the game program outputs a readout request for a predetermined file included in the game file to the file system 140 according to a game operation of the user. The access request receiving section 142 receives an access request for the game file, and the block conversion section 144 refers to the first correspondence table 132 to identify the physical block in the physical storage 2 which is associated with the logical block of the game file to be subject to the readout request. For example, in a case in which the logical block 3 of the game file is subject to the readout request, the block conversion section 144 refers to the first correspondence table 132 to identify the physical block 3 associated with the logical block 3 of the game file. Accordingly, the accessing section 146 accesses the physical block identified by the block conversion section 144, so that data that has been recorded is read out.

In the information processing system 1, the information processing device 10 acquires a patch file from the content server 12 to update the game software. Applying the patch to the game software allows for deletion, modification, and addition of a game scenario. The patch file includes at least file configuration information specifying a file to be reused in the original game software and a file for addition (additional file) that is to be added to the original game. In a case in which a scenario of the game is simply added, the file configuration information specifies that all the files of the original game software are to be reused. In contrast, in such a case to delete a file that causes a bug in the original game software, the file configuration information deletes the file and specifies that another file (that may be a file for addition) in place of the file is to be used.

In the content server 12, when the patch file of the game software becomes a downloadable state, the content server 12 informs the information processing device 10 to that effect. Accordingly, the installer 110 starts the downloading process of the patch file.

In the embodiment, the file management section 114 acquires the data size of the patch file from the content server 12, prior to downloading of the patch file, and secures a free space for the data size of the patch file on the physical storage 2. Thereafter, the acquisition section 112 downloads the patch file, and the record processing section 116 installs the patch file into the secured physical storage 2.

In the conventional procedure of updating game software, in order to copy game software that has been installed, it has been necessary to secure a free space for a capacity resulting from adding up the data size of the game software that has been installed and the data size of a patch file. However, in the procedure of updating game software in the present embodiment, game software is not copied. Hence, the file management section 114 only needs to secure the free space corresponding to the data size of the patch file, so that it becomes easy to secure the free space. Hereinafter, the file for the game included in the patch file is referred to as an "additional file."

FIG. 6 illustrates a state in which an additional file is recorded on the physical storage 2. The additional file is divided into a plurality of logical blocks, and the logical blocks are assigned logical block numbers in the additional file. The file management section 114 associates the plurality of logical blocks of the additional file with corresponding ones of the plurality of physical blocks. In this example, the logical blocks having the logical block numbers 1 to 3 in the additional file are associated with the physical blocks having the physical block numbers 16 to 18.

FIG. 7 illustrates an example of the first correspondence table 132 indicating the correspondence relation in FIG. 6. The file management section 114 writes the correspondence relation between the logical blocks of the additional file and the physical blocks of the physical storage 2 in the first correspondence table 132 indicated in FIG. 5. The file management section 114 causes the correspondence table holding section 130 to hold the updated first correspondence table 132.

The file management section 114 records the updated game software.

FIG. 8 illustrates the updated game software. Hereinafter, the updated game software is simply referred to also as an "updated game file." The updated game file is divided into a plurality of logical blocks, and the logical blocks are assigned logical block numbers in the updated game file. The file management section 114 associates the plurality of logical blocks of the updated game file with logical blocks of another file.

In the example of FIG. 8, the logical blocks having the logical block numbers 1 to 8 in the updated game file are associated with the logical blocks having the logical block numbers 1 to 8 in the game file, and the logical blocks having the logical block numbers 9 to 11 in the updated game file are associated with the logical blocks having the logical block numbers 1 to 3 in the additional file. In this example, the logical blocks having the logical block numbers 9 and 10 in the game file are not associated with the logical blocks of the updated game file.

FIG. 9 illustrates an example of the second correspondence table 134 indicating the correspondence relation of FIG. 8. The file management section 114 creates the correspondence table 134 indicating the correspondence relation between some of the plurality of logical blocks of the updated game file and M (M≤N) logical blocks of the game file and the correspondence relation between remaining ones of the plurality of logical blocks of the updated game file and the logical blocks of the additional file. The file management section 114 causes the correspondence table holding section 130 to hold the created correspondence table 134. In a case in which the updated game file includes all the files of the original game file, a relation M=N is satisfied. In a case in which the updated game file includes part of the files of the original game file, a relation M<N is satisfied.

In the information processing device 10 in the present embodiment, the file management section 114 creates the second correspondence table 134, thereby making it possible to associate the logical blocks of the updated game file with the corresponding ones of the logical blocks of the game file and with the corresponding ones of the logical blocks of the additional file. Accordingly, data corresponding to the logical blocks having the logical block numbers 1 to 8 of the game file does not need to be moved within the physical storage 2 and can be used in the updated game file.

Also, as indicated in FIG. 8, the logical blocks having the logical block numbers 9 and 10 of the game file are not associated with the logical blocks of the updated game file. Accordingly, the record processing section 116 deletes data of the physical blocks of the physical storage 2 associated with the logical blocks of the game file which are not associated with the logical blocks of the updated game file. Hence, this makes it possible to make the physical blocks having the physical block numbers 9 and 10 free.

In the following, operation of the processing section 100 when the user plays the updated game will be described. The execution section 120 executes the game program of the updated game file, and the game program outputs a readout request for a predetermined file included in the updated game file to the file system 140, in response to the game operation performed by the user. The access request receiving section 142 receives an access request for the updated game file.

The block conversion section 144 refers to the second correspondence table 134 to identify the logical block of the game file or the additional file each of which is associated with the logical block of the updated game file which is subject to the access request. Subsequently, the block conversion section 144 refers to the first correspondence table 132 to identity the physical block of the physical storage 2 associated with the identified logical block of the game file or the additional file. For example, in a case in which the logical block 3 of the updated game file is subject to the access request, the block conversion section 144 refers to the second correspondence table 134 to identify the logical block 3 of the game file associated with the logical block 3 of the updated game file. Subsequently, the block conversion section 144 refers to the first correspondence table 132 to identity the physical block 3 associated with the logical block 3 of the game file. As a result, the accessing section 146 accesses the physical block identified by the block conversion section 144 to read out data that has been recorded.

According to the file management technique of the present embodiment, in a case in which the physical block that has been recorded is changed, the file management section 114 updates the first correspondence table 132 but need not update the second correspondence table 134. For example, even in a case in which multiple types of physical storages 2 having different properties are provided and movement of game files between the multiple physical storages 2 are often carried out, it is only required that the file management section 114 updates the first correspondence table 132 only, and accordingly, the file management becomes easy.

The present invention has been described above on the basis of the embodiment thereof. The foregoing embodiment is illustrative, and it is to be understood by those skilled in the art that combinations of constituent elements and processing processes of the embodiment are susceptible of various modifications and that such modifications also fall within the scope of the present invention. In the foregoing embodiment, a game is provided as an example of an application. However, the present invention may be applied to other applications.

In the second correspondence table 134 in the present embodiment, the logical block of one file is associated with the logical block of another file. In the second correspondence table 134 of a modification example, the logical block of one file may be associated with the logical blocks of a plurality of files.

INDUSTRIAL APPLICABILITY

The present invention can be applied to the technical field for accessing a file.

REFERENCE SIGNS LIST

1: Information processing system
2: Physical storage
10: Information processing device
100: Processing section
102: Communication section
110: Installer
112: Acquisition section
114: File management section
116: Record processing section 120: Execution section
130: Correspondence table holding section
132: First correspondence table
134: Second correspondence table
140: File system
142: Access request receiving section
144: Block conversion section
146: Accessing section

The invention claimed is:

1. An information processing device having a function of accessing a file, comprising:
   a first correspondence table indicating a correspondence relation between logical blocks of a first file and physical blocks of a physical storage;
   a second correspondence table indicating a correspondence relation between logical blocks of a second file and the logical blocks of the first file;
   an access request receiving section which receives an access request for the second file;
   a block conversion section which refers to the second correspondence table, identifies a logical block of the first file associated with the logical block of the second file that is subject to the access request, and then refers to the first correspondence table to identify a physical block of the physical storage associated with the identified logical block of the first file; and
   an accessing section which accesses the identified physical block.

2. The information processing device according to claim 1, further comprising:
   a record processing section which records data of the first file in the physical blocks, wherein
   the record processing section deletes data in the physical blocks of the physical storage that are associated with the logical blocks of the first file that are not associated with the logical blocks of the second file.

3. The information processing device according to claim 1, further comprising:
   a file management section which creates the first correspondence table and the second correspondence table, wherein,
   in a case in which the second file is of an updated version in which a third file is added to some or all of files of the first file,
   the file management section writes a correspondence relation between logical blocks of the third file and the physical blocks of the physical storage in the first correspondence table, and writes a correspondence relation between the logical blocks of the second file and the logical blocks of the third file in the second correspondence table.

4. A method of accessing a file, comprising:
   holding a first correspondence table indicating a correspondence relation between logical blocks of a first file and physical blocks of a physical storage, and a second correspondence table indicating a correspondence relation between logical blocks of a second file and the logical blocks of the first file;
   receiving an access request for the second file;
   referring to the second correspondence table, and identifying a logical block of the first file associated with the logical block of the second file that is subject to the access request, and then referring to the first correspondence table to identify a physical block of the physical storage associated with the identified logical block of the first file; and
   accessing the identified physical block.

5. A non-transitory, computer readable storage medium containing a computer program, which when executed by a computer, causes the computer to perform method of accessing a file by carrying out actions, comprising:
   holding a first correspondence table indicating a correspondence relation between logical blocks of a first file and physical blocks of a physical storage, and a second correspondence table indicating a correspondence relation between logical blocks of a second file and the logical blocks of the first file;
   receiving an access request for the second file;
   referring to the second correspondence table, and identifying a logical block of the first file associated with the logical block of the second file that is subject to the access request, and then referring to the first correspondence table to identify a physical block of the physical storage associated with the identified logical block of the first file; and
   accessing the identified physical block.

* * * * *